United States Patent Office 2,803,612
Patented Aug. 20, 1957

2,803,612

9-OCTADECENAMIDE-POLYETHYLENE COMPOSITIONS

Hallard C. Moyer, Homewood, Ill., assignor to Sinclair Refining Company, New York, N. Y., a corporation of Maine No Drawing. Application June 3, 1954,
Serial No. 434,319

4 Claims. (Cl. 260—28.5)

This invention relates to paraffin wax-containing compositions characterized by improved slip properties and to new additive compositions useful in conjunction with paraffin waxes to improve their slip.

Large quantities of paraffin wax are consumed by the paper industry as a coating and treating material for paper, cartons, dairy applications and similar uses. In the majority of applications, the use of additives to impart a particular property or improve an existing property is a common occurrence. For example, one of the most important and widely used additives is polyethylene. Generally, this additive acts to improve gloss, blocking point and scuff resistance.

Low friction or good "slip" is a property desired in many wax coatings in order to permit rapid handling on high speed production, filling, and packaging machinery. While there is no generally recognized additive for improving the slip of paraffin wax, it is known that polyethylene does improve slip in tacky waxes to a slight extent. However, the addition of polyethylene to waxes exhibiting good slip usually affects this property in an adverse manner.

I have now discovered that paraffin wax-containing compositions can be produced having superior slip characteristics. I have also discovered that markedly superior slip characteristics may be produced in paraffin wax-containing compositions while retaining or improving other properties thereof such as the gloss, blocking point and scuff resistance. These and other advantages are obtained by incorporating polyethylene and octadecenamide in paraffin wax and by my novel compositions comprising paraffin wax, polyethylene, and octadecenamide.

In accordance with my invention the slip characteristics of wax-polyethylene compositions are improved by employing amounts of octadecenamide therein sufficient to impart slip characteristics to the wax composition. Amounts of octadecenamide as small as 0.25% based on the weight of paraffin wax, have been found to improve the slip. Generally there is no upper limit on the quantity of octadecenamide which can be employed; however, high concentrations of octadecenamide tend to darken the paraffin, impart an odor and can form a precipitate when the compositions stand in the molten state for extended periods of time. For these reasons, an advantageous upper limit of octadecenamide is about 4% with an over-all range of about 0.5 to 3% constituting the preferred range. An octadecenamide which is available commercially and which I have found to be eminently suitable for employment in my invention is 9-octadecenamide (oleamide).

The minimum effective concentration of polyethylene in my novel compositions is about 0.25% based on the weight of paraffin wax. There appears to be no upper limit on the concentration of polyethylene permissible in my compositions; however, for the majority of applications, the compositions contain a minor amount of polyethylene; for instance, a concentration of up to about 10% of polyethylene is usually sufficient. The preferred range is about 1% to 10%. The polyethylenes suitable for use in my invention are those employed in wax compositions and coatings. These polyethylenes commonly have molecular weights ranging from 2,000 to about 24,000.

The paraffin wax-polyethylene octadecenamide compositions of my invention can be compounded in any manner presently known to the art for producing additive-containing paraffin wax compositions. One very simple and effective method for making these compositions consists of heating the wax until it is in molten state and adding the polyethylene and octadecenamide while stirring the mixture until the composition becomes homogeneous. In the alternative, the additives can be added to the wax sequentially or they can be premixed and added to the wax while the wax is at room temperature with the mixture then being heated and stirred until homogeneous. The polyethylene-octadecenamide compositions can be prepared by heating from about 1 to 16 parts of an octadecenamide at an elevated temperature, for instance about 100° C., and dispersing about 1 to 40 parts of a polyethylene in it by stirring. For example, one pound of 9-octadecenamide can be heated to about 100° C., and three pounds of polyethylene can then be dispersed therein by stirring. My novel compositions can be used in any manner for using wax compositions; however, it is preferable that the coating be rapidly cooled in the manner normally used for producing a glossy coating. An example would be to heat the composition until molten and coat papers or butter cartons by dipping such objects in the molten paraffin wax-polyethylene-oleamide composition, removing the coated object and cooling by immersion in cold water. Of course my compositions can contain other additives normally used, such as oxidation inhibitors, providing the improved slip properties are not materially lessened.

To demonstrate the slip characteristics of my novel compositions, twelve samples were prepared. The wax was melted, and additives were dispersed into eight samples of the wax by simple stirring. Four samples of wax had no additives; a fifth sample contained polyethylene but no octadecenamide; a sixth sample contained octadecenamide but had no polyethylene therein; the remaining six samples contained both the polyethylene and an octadecenamide. The octadecenamide employed in all cases was 9-octadecenamide. The compositions were applied to pieces of sulphite breadwrap paper at a coating weight equivalent to 12–13 lbs. per ream (3000 ft.$^2$). Two pieces of each coated breadwrap paper were then cut to dimensions of 1″ x 3″ and 1″ x 12″, respectively. The slip characteristics were tested by placing the two samples of wax coated paper having the same composition thereon face to face on a table with the 1″ x 3″ sample uppermost. A weight was applied to the top paper which was equivalent to a fixed pressure of 0.1 p. s. i. The force of friction between the papers in sliding contact at a rate of twelve inches per minute under the 0.1 p. s. i. load was measured. The results are tabulated below:

*Table I*

[All percentages are weight percent of paraffin wax present.]

| Example No. | Paraffin Wax Type [1] | Polyethylene,[2] percent | 9-octadecenamide, percent | Friction,[3] gms. |
|---|---|---|---|---|
| 1 | A | 0 | 0 | 46 |
| 2 | A | 2 | 0 | 54 |
| 3 | A | 0 | 3 | 45 |
| 4 | A | 1 | 1 | 39 |
| 5 | A | 2 | 1 | 33 |
| 6 | A | 2 | 3 | 20 |
| 7 | B | 0 | 0 | 100 |
| 8 | B | 2 | 1 | 19 |
| 9 | C | 0 | 0 | 60 |
| 10 | C | 2 | 1 | 20 |
| 11 | D | 0 | 0 | 41 |
| 12 | D | 2 | 1 | 27 |

[1] Waxes A, B, C, and D are paraffin base waxes derived from mid-continent crudes.
[2] Polyethylene was 7,000–8,000 mol. wt.
[3] Minimum force required to maintain relative movement of the samples.

The results shown in Table I demonstrate the reduction in friction resulting when my novel wax compositions are employed. Examples numbered 2 and 3 show the absence of any materially favorable effect on slip resulting from either polyethylene or 9-octadecenamide alone. Compositions within my invention show as much as a fivefold improvement in the case of one wax (wax B) and substantial improvement with waxes which had better slip characteristics than wax B prior to the use of my additives therein.

I claim:

1. A paraffin wax-polyethylene composition having a polyethylene content of about 0.25 to 10% by weight based on the paraffin wax and containing a quantity of 9-octadecenamide effective to improve the slip properties of the said wax-polyethylene composition, said polyethylene having a molecular weight from about 2000 to about 24,000 and said quantity of amide constituting at least about 0.25% by weight based on the paraffin wax.

2. A new composition of matter consisting essentially of paraffin wax, about 0.25 to 10% by weight based on the paraffin wax of a polyethylene having a molecular weight from about 2000 to about 24,000 and about 0.25 to 4% by weight based on the paraffin wax of 9-octadecenamide.

3. The composition of claim 2 wherein the amount of 9-octadecenamide present is about 0.5 to 3% by weight based on the paraffin wax and the polyethylene present is about 1 to 10% by weight based on the paraffin wax.

4. A new composition of matter consisting essentially of about 1 to 40 parts of a polyethylene having a molecular weight from about 2000 to about 24,000 and about 1 to 16 parts of 9-octadecenamide.

References Cited in the file of this patent

UNITED STATES PATENTS

| 2,523,705 | Lovell et al. | Sept. 26, 1950 |
| 2,559,645 | Larsen et al. | July 10, 1951 |
| 2,566,516 | Derby | Sept. 4, 1951 |